US012614157B2

(12) United States Patent
Dohkoh et al.

(10) Patent No.: US 12,614,157 B2
(45) Date of Patent: Apr. 28, 2026

(54) METHOD AND SYSTEM FOR PROVIDING HOSTED PORTALS

(71) Applicant: JPMorgan Chase Bank, N.A., New York, NY (US)

(72) Inventors: Takashi Dohkoh, Hyogo-Ken (JP); Satoshi Shimmyo, Tokyo (JP); Kokoro Yamada, Kanagawa-Ken (JP); Justin Ho, Queens, NY (US); Ithihas Mangalore Nagaraj, Bangalore (IN); Prathmesh Gandhi, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 43 days.

(21) Appl. No.: 18/119,554

(22) Filed: Mar. 9, 2023

(65) Prior Publication Data

US 2024/0249252 A1 Jul. 25, 2024

(30) Foreign Application Priority Data

Jan. 24, 2023 (IN) .............................. 202311004708

(51) Int. Cl.
G06Q 20/02 (2012.01)
G06Q 20/10 (2012.01)
G06Q 20/40 (2012.01)

(52) U.S. Cl.
CPC ......... *G06Q 20/02* (2013.01); *G06Q 20/4014* (2013.01); *G06Q 20/407* (2013.01); *G06Q 20/1085* (2013.01)

(58) Field of Classification Search
None
See application file for complete search history.

(56) References Cited

U.S. PATENT DOCUMENTS 10,467,615 B1 * 11/2019 Omojola ............ G06Q 30/0637

* cited by examiner

*Primary Examiner* — Matthew S Gart
*Assistant Examiner* — Amit Patel
(74) *Attorney, Agent, or Firm* — Greenblum & Bernstein, P.L.C.

(57) ABSTRACT

A method for providing a hosted portal to facilitate secured payouts is disclosed. The method includes receiving, via the hosted portal, a request from a first user, the request including a refund request from the first user to a second user, user information, and transaction information; generating a hyperlink for the second user based on the transaction information, the hyperlink referencing the hosted portal; validating the request by using the user information; transmitting, via a communication channel, the hyperlink to the second user based on a result of the validating; receiving, via the hosted portal, payout information from the second user; and automatically initiating a transaction based on the transaction information and the payout information.

14 Claims, 5 Drawing Sheets

500

400

500

METHOD AND SYSTEM FOR PROVIDING HOSTED PORTALS

CROSS-REFERENCE TO RELATED APPLICATIONS

This application claims the benefit of Indian Non-Provisional Patent Application No. 202311004708, filed Jan. 24, 2023, which is hereby incorporated by reference in its entirety.

BACKGROUND

1. Field of the Disclosure

This technology generally relates to methods and systems for hosted portals, and more particularly to methods and systems for providing hosted portals to facilitate secured payouts via individualized hyperlinks for end users.

2. Background Information

Many marketplace-based businesses offer expanded payment options such as, for example, locally available payment methods to meet the needs of customers. Often, these expanded payment options rely on different technologies and various payment processes to provide functionalities such as, for example, payments and refunds for the customers. Historically, implementations of these conventional technologies have resulted in varying degrees of success with respect to effective and secure customer interactions.

One drawback of using the conventional technologies is that in many instances, the marketplace-based businesses do not have a source such as, for example, a corresponding bank account wherein refunds may be returned to the customers. As a result, the functionalities available for the customers may be limited. Additionally, the customers may not be comfortable sharing sensitive information such as, for example, bank account details with an untrusted party to enable the refunds.

Therefore, there is a need for a hosted portal that facilitates secured payouts for the customers via individualized hyperlinks that enable protected account registration for refunds regardless of initial payment method.

SUMMARY

The present disclosure, through one or more of its various aspects, embodiments, and/or specific features or sub-components, provides, inter alia, various systems, servers, devices, methods, media, programs, and platforms for providing hosted portals to facilitate secured payouts via individualized hyperlinks for end users.

According to an aspect of the present disclosure, a method for providing a hosted portal to facilitate secured payouts is disclosed. The method is implemented by at least one processor. The method may include receiving, via the hosted portal, at least one request from a first user, the at least one request may include a refund request from the first user to a second user, user information, and transaction information; generating at least one hyperlink for the second user based on the transaction information, the at least one hyperlink may reference the hosted portal; validating the at least one request by using the user information; transmitting, via a communication channel, the at least one hyperlink to the second user based on a result of the validating; receiving, via the hosted portal, payout information from the second user;

and automatically initiating at least one transaction based on the transaction information and the payout information.

In accordance with an exemplary embodiment, the method may further include receiving, via the hosted portal, an indication from the second user to persist the payout information; tokenizing the payout information; associating the tokenized payout information together with the second user; and persisting, in a repository, the association together with information that relates to the automatically initiated at least one transaction.

In accordance with an exemplary embodiment, to tokenize the payout information, the method may further include parsing the payout information to identify at least one element; and substituting each of the at least one element with a token, the token may include an identifier that that references the corresponding at least one element.

In accordance with an exemplary embodiment, the method may further include generating at least one response for the first user, the at least one response may include status information and the tokenized payout information; and transmitting, via a communication interface, the at least one response to the first user, wherein the status information may correspond to the automatically initiated at least one transaction.

In accordance with an exemplary embodiment, the method may further include receiving, via the hosted portal, account information for a third user; registering the account information to onboard the third user; tokenizing the account information; associating the tokenized account information together with the third user; and persisting, in a repository, the association together with a trigger that automatically bypasses hyperlink generation for the third user.

In accordance with an exemplary embodiment, to automatically initiate the at least one transaction, the method may further include generating at least one code, the at least one code may include at least one from among a human-readable textual code and a machine-readable optical code; associating the at least one code with the second user; and transmitting, via the communication channel, the at least one code to the second user.

In accordance with an exemplary embodiment, the method may further include receiving, via an automated teller machine, the at least one code from the second user; authenticating the at least one code based on the association; and initiating, via the automated teller machine, a distribution for the second user based on a result of the authenticating, the distribution may correspond to the transaction information.

In accordance with an exemplary embodiment, the authenticating may include multi-factor authentication via a user device of the second user.

In accordance with an exemplary embodiment, the communication channel may be determined based on data extracted from the user information, the communication channel may include at least one from among an electronic mail channel, a chat channel, and a multimedia messaging channel.

According to an aspect of the present disclosure, a computing device configured to implement an execution of a method for providing a hosted portal to facilitate secured payouts is disclosed. The computing device including a processor; a memory; and a communication interface coupled to each of the processor and the memory, wherein the processor may be configured to receive, via the hosted portal, at least one request from a first user, the at least one request may include a refund request from the first user to a second user, user information, and transaction information;

generate at least one hyperlink for the second user based on the transaction information, the at least one hyperlink may reference the hosted portal; validate the at least one request by using the user information; transmit, via a communication channel, the at least one hyperlink to the second user based on a result of the validating; receive, via the hosted portal, payout information from the second user; and automatically initiate at least one transaction based on the transaction information and the payout information.

In accordance with an exemplary embodiment, the processor may be further configured to receive, via the hosted portal, an indication from the second user to persist the payout information; tokenize the payout information; associate the tokenized payout information together with the second user; and persist, in a repository, the association together with information that relates to the automatically initiated at least one transaction.

In accordance with an exemplary embodiment, to tokenize the payout information, the processor may be further configured to parse the payout information to identify at least one element; and substitute each of the at least one element with a token, the token may include an identifier that that references the corresponding at least one element.

In accordance with an exemplary embodiment, the processor may be further configured to generate at least one response for the first user, the at least one response may include status information and the tokenized payout information; and transmit, via the communication interface, the at least one response to the first user, wherein the status information may correspond to the automatically initiated at least one transaction.

In accordance with an exemplary embodiment, the processor may be further configured to receive, via the hosted portal, account information for a third user; register the account information to onboard the third user; tokenize the account information; associate the tokenized account information together with the third user; and persist, in a repository, the association together with a trigger that automatically bypasses hyperlink generation for the third user.

In accordance with an exemplary embodiment, to automatically initiate the at least one transaction, the processor may be further configured to generate at least one code, the at least one code may include at least one from among a human-readable textual code and a machine-readable optical code; associate the at least one code with the second user; and transmit, via the communication channel, the at least one code to the second user.

In accordance with an exemplary embodiment, the processor may be further configured to receive, via an automated teller machine, the at least one code from the second user; authenticate the at least one code based on the association; and initiate, via the automated teller machine, a distribution for the second user based on a result of the authenticating, the distribution may correspond to the transaction information.

In accordance with an exemplary embodiment, the authenticating may include multi-factor authentication via a user device of the second user.

In accordance with an exemplary embodiment, the processor may be further configured to determine the communication channel based on data extracted from the user information, the communication channel may include at least one from among an electronic mail channel, a chat channel, and a multimedia messaging channel.

According to an aspect of the present disclosure, a non-transitory computer readable storage medium storing instructions for providing a hosted portal to facilitate secured payouts is disclosed. The storage medium including executable code which, when executed by a processor, may cause the processor to receive, via the hosted portal, at least one request from a first user, the at least one request may include a refund request from the first user to a second user, user information, and transaction information; generate at least one hyperlink for the second user based on the transaction information, the at least one hyperlink may reference the hosted portal; validate the at least one request by using the user information; transmit, via a communication channel, the at least one hyperlink to the second user based on a result of the validating; receive, via the hosted portal, payout information from the second user; and automatically initiate at least one transaction based on the transaction information and the payout information.

In accordance with an exemplary embodiment, when executed by the processor, the executable code may further cause the processor to receive, via the hosted portal, an indication from the second user to persist the payout information; tokenize the payout information; associate the tokenized payout information together with the second user; and persist, in a repository, the association together with information that relates to the automatically initiated at least one transaction.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
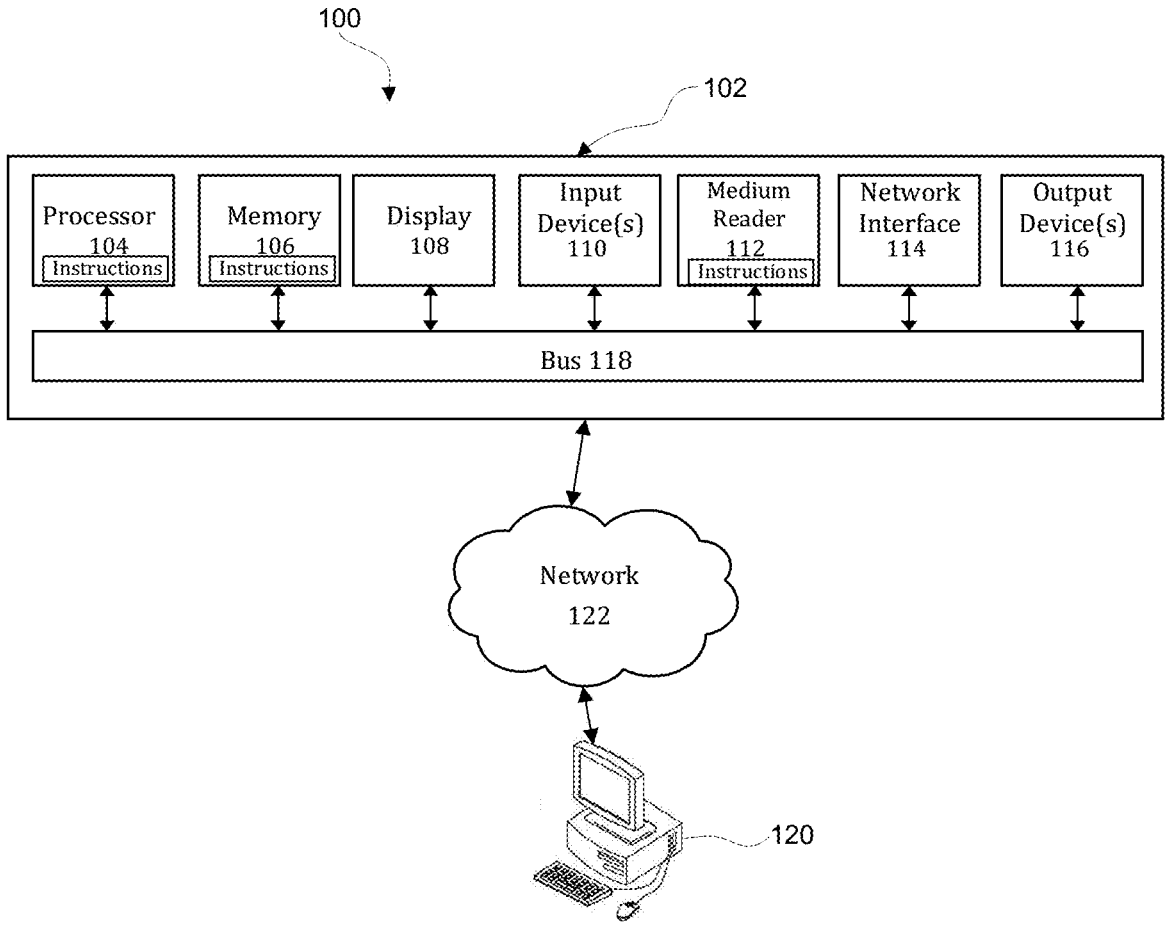
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing hosted portals to facilitate secured payouts via individualized hyperlinks for end users.

Figure 2:
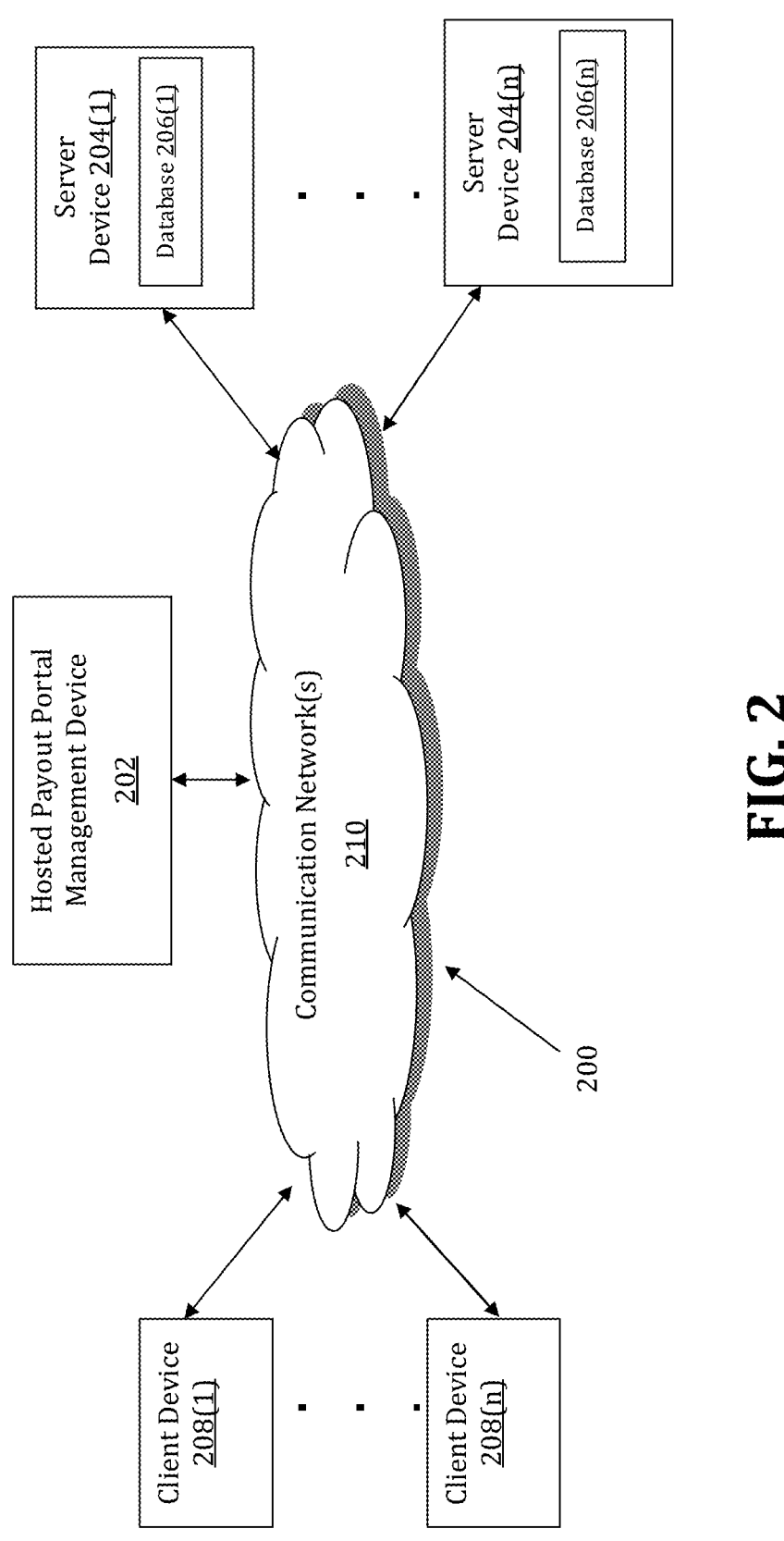
FIG. 2 illustrates an exemplary diagram of a network environment.

Referring to FIG. 2, a schematic of an exemplary network environment 200 for implementing a method for providing hosted portals to facilitate secured payouts via individualized hyperlinks for end users is illustrated. In an exemplary embodiment, the method is executable on any networked computer platform, such as, for example, a personal computer (PC).

The method for providing hosted portals to facilitate secured payouts via individualized hyperlinks for end users may be implemented by a Hosted Payout Portal Management (HPPM) device 202. The HPPM device 202 may be the same or similar to the computer system 102 as described with respect to FIG. 1. The HPPM device 202 may store one or more applications that can include executable instructions that, when executed by the HPPM device 202, cause the HPPM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the HPPM device 202 itself, may be located in virtual server(s) running in a cloud-based computing environment rather than being tied to one or more specific physical network computing devices. Also, the application(s) may be running in one or more virtual machines (VMs) executing on the HPPM device 202. Additionally, in one or more embodiments of this technology, virtual machine(s) running on the HPPM device 202 may be managed or supervised by a hypervisor.

In the network environment 200 of FIG. 2, the HPPM device 202 is coupled to a plurality of server devices 204(1)-204(n) that hosts a plurality of databases 206(1)-206(n), and also to a plurality of client devices 208(1)-208(n) via communication network(s) 210. A communication interface of the HPPM device 202, such as the network interface 114 of the computer system 102 of FIG. 1, operatively couples and communicates between the HPPM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the HPPM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and HPPM devices that efficiently implement a method for providing hosted portals to facilitate secured payouts via individualized hyperlinks for end users.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The HPPM device 202 may be a standalone device or integrated with one or more other devices or apparatuses, such as one or more of the server devices 204(1)-204(n), for example. In one particular example, the HPPM device 202 may include or be hosted by one of the server devices 204(1)-204(n), and other arrangements are also possible. Moreover, one or more of the devices of the HPPM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the HPPM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to refund requests, user information, transaction information, hyperlinks, hosted portals, communication channels, payout information, tokens, status information, account information, and transaction codes.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the HPPM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the HPPM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the HPPM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the HPPM device 202, the server devices 204(1)-204(n), or the client devices 208(1)-208(n), for example, may be configured to operate as virtual instances on the same physical machine. In other words, one or more of the HPPM device 202, the server devices 204(1)-204(n), or the client devices 208(1)-208(n) may operate on the same physical device rather than as separate devices communicating through communication network(s) 210. Additionally, there may be more or fewer HPPM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
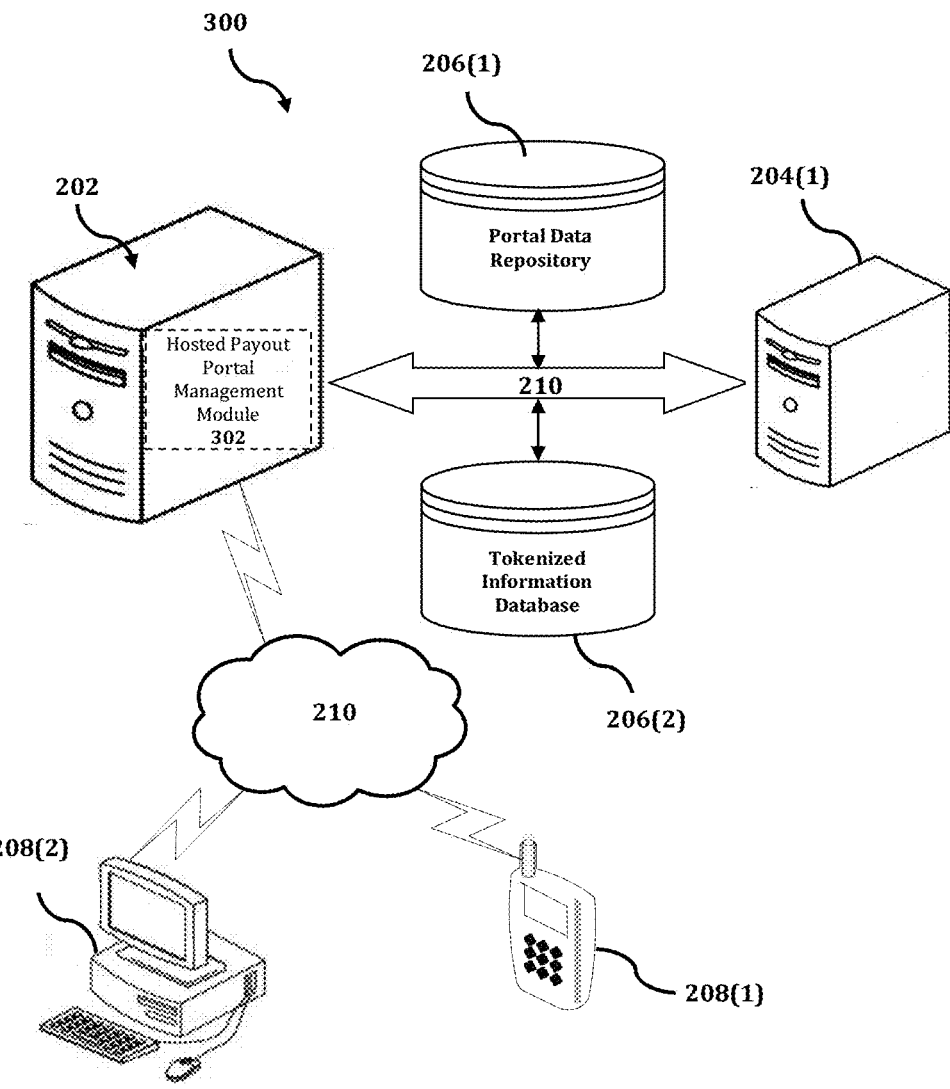
FIG. 3 shows an exemplary system for implementing a method for providing hosted portals to facilitate secured payouts via individualized hyperlinks for end users.

The HPPM device 202 is described and shown in FIG. 3 as including a hosted payout portal management module 302, although it may include other rules, policies, modules, databases, or applications, for example. As will be described below, the hosted payout portal management module 302 is configured to implement a method for providing hosted portals to facilitate secured payouts via individualized hyperlinks for end users.

An exemplary process 300 for implementing a mechanism for providing hosted portals to facilitate secured payouts via individualized hyperlinks for end users by utilizing the network environment of FIG. 2 is shown as being executed in FIG. 3. Specifically, a first client device 208(1) and a second client device 208(2) are illustrated as being in communication with HPPM device 202. In this regard, the first client device 208(1) and the second client device 208(2) may be "clients" of the HPPM device 202 and are described herein as such. Nevertheless, it is to be known and understood that the first client device 208(1) and/or the second client device 208(2) need not necessarily be "clients" of the HPPM device 202, or any entity described in association therewith herein. Any additional or alternative relationship may exist between either or both of the first client device 208(1) and the second client device 208(2) and the HPPM device 202, or no relationship may exist.

Further, HPPM device 202 is illustrated as being able to access a portal data repository 206(1) and a tokenized information database 206(2). The hosted payout portal management module 302 may be configured to access these databases for implementing a method for providing hosted portals to facilitate secured payouts via individualized hyperlinks for end users.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the HPPM device 202 via broadband or cellular communication. Of course, these embodiments are merely exemplary and are not limiting or exhaustive.

Upon being started, the hosted payout portal management module 302 executes a process for providing hosted portals to facilitate secured payouts via individualized hyperlinks for end users. An exemplary process for providing hosted portals to facilitate secured payouts via individualized hyperlinks for end users is generally indicated at flowchart 400 in FIG. 4.

Figure 4:
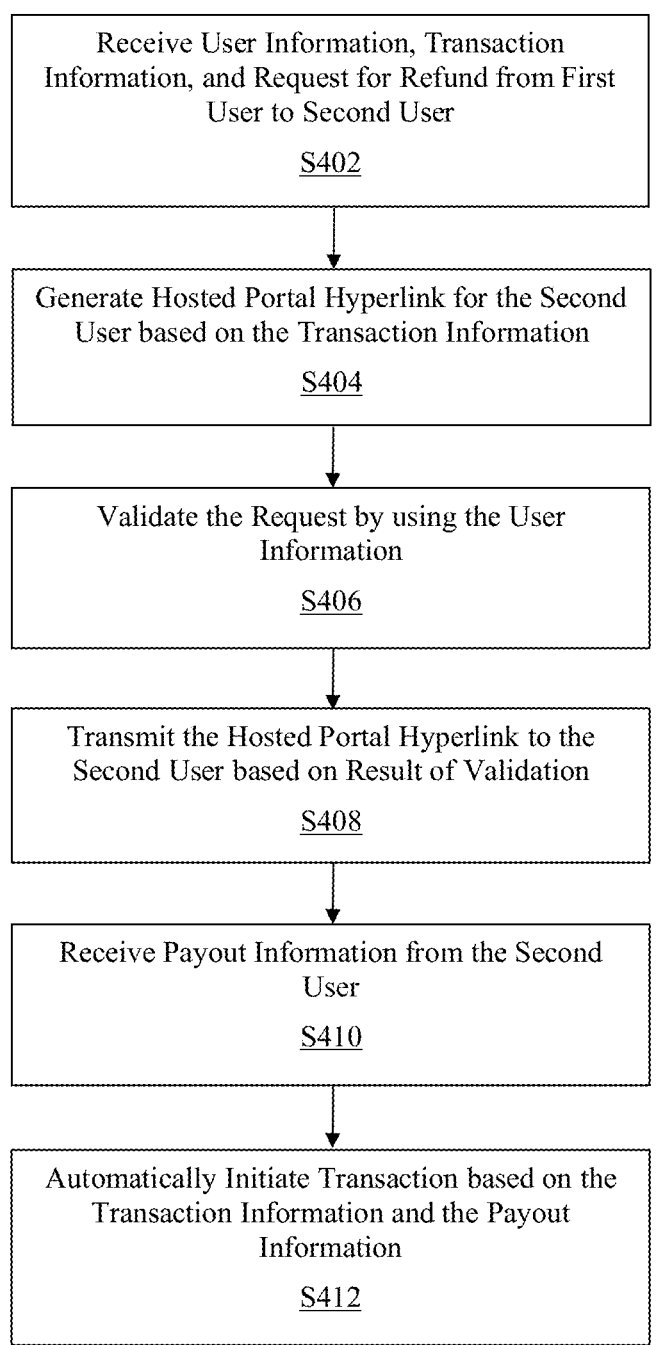
FIG. 4 is a flowchart of an exemplary process for implementing a method for providing hosted portals to facilitate secured payouts via individualized hyperlinks for end users.

In the process 400 of FIG. 4, at step S402, a request from a first user may be received via a hosted portal. The request may include a refund request from the first user to a second user as well as user information and transaction information. In an exemplary embodiment, the hosted portal may include secured user portals and hosted payout pages. The hosted portal may correspond to a website and/or a web page that provides access and/or links to other sites. In another exemplary embodiment, the hosted portal may be persisted on a server and/or computing device such that the portal may be accessed over a computing network such as, for example, the internet. The hosted portal may be persisted on a first-party server as well as a third-party server. For example, the portal may be hosted by a reputable third-party server that provides access to the portal via the internet.

In another exemplary embodiment, the request may correspond to instructions from the first user to initiate a payment for the second user. The request may be initiated by the first user in response to an action sought by the second user. For example, the second user may desire a refund from the first user, who initiates the refund request.

In another exemplary embodiment, the first user may correspond to a merchant who provides goods and/or services for the second user. The first user may correspond to any party who is associated with the merchant such as, for example, an operator at a merchant call center. The first user may be granted permission and/or authorization by the merchant to engage in financial transactions on behalf of the merchant such as, for example, initiating refund payments to consumers. In another exemplary embodiment, the second user may correspond to a customer of the first user. The second user may include any person, groups of people, and/or entity who engages in a business relationship with the merchant for goods and/or services. The second user may be a consumer of the goods and/or services provided by the merchant.

In another exemplary embodiment, the refund request may include user information and transaction information. The user information may include data that corresponds to the first user and the second user. For example, the data may include personally identifiable information for the users such as a user identifier and a user account number, user preference information such as a preferred communication preference, as well as user device information such as an internet protocol (IP) address. The transaction information may include information that corresponds the refund request. For example, the transaction information may include a refund amount. Consistent with present disclosure, information such as, for example, account information may be categorized as user information as well as information that facilitates the refund transaction.

At step S404, a hyperlink may be generated for the second user based on the transaction information. The hyperlink may reference the hosted portal. In an exemplary embodiment, the hyperlink may correspond to a reference that a user may follow by interacting with the hyperlink. The hyperlink may point to a data storage location to enable data access. For example, the hyperlink may reference a specific data location in a networked server that is hosting the portal. In another exemplary embodiment, the hyperlink may be unique to the second user and the refund request. For example, a new hyperlink may be generated for the second user when a new refund is requested.

In another exemplary embodiment, the hyperlink may be generated with operating parameters according to predetermined guidelines. The operating parameters may correspond to a characteristic of the hyperlink such as, for example, an expiration time characteristic that dictates operation of the hyperlink. For example, the hyperlink may include an expiration parameter of thirty minutes, after which the functionality of the hyperlink may be limited. In another exemplary embodiment, the operating parameters of the hyperlink may be directly included in the hyperlink itself. For example, the operating parameters may be encoded in the hypertext mark-up language (HTML). In another exemplary embodiment, the operating parameters of the hyperlink may be associated with the second user. For example, upon indication that the hyperlink has been interacted with by the second user, the hosted portal may be presented to the second user based on the associated operating parameters.

At step S406, the request may be validated by using the user information. In an exemplary embodiment, the request may be parsed to extract the user information. The parsed user information may be compared with stored user information to ensure that the request is accurate and within predetermined constraints. For example, the user information may include personally identifiable information that is usable to verify the identity of the user making the request. Consistent with present disclosures, the personally identifiable information may be verified based on a comparison with known information.

In another exemplary embodiment, the constraints may be predetermined by the requesting user. For example, the requesting user may dictate that automated refunds consistent with present disclosures are only available for transactions within a value range. As such, requests that are made outside of the value range may not be validated. In another exemplary embodiment, the constraints may be predetermined by an operator of the hosted portal. For example, a financial institution that hosts the portal may dictate that automated refunds consistent with present disclosures are only available when an amount of the refund is within the account balance of the requesting user. As such, requests that are made above an available account balance may not be validated.

At step S408, the hyperlink may be transmitted to the second user based on a result of the validating. The hyperlink may be transmitted to the second user via a communication channel. In an exemplary embodiment, the communication channel may be determined based on data extracted from the user information. The communication channel may include at least one from among an electronic mail channel, a chat channel, and a multimedia messaging channel.

For example, the user information may include an email address for the second user. A message that includes the hyperlink and corresponding instructions may be generated and sent to the email address. In another example, the user information may include a phone number. A message that includes the hyperlink and corresponding instructions may be generated and sent as a text message to the phone number. In another example, the user information may include a chat username. A message that includes the hyperlink and corresponding instructions may be generated and sent as a chat message to the chat username.

At step S410, payout information may be received from the second user. The payout information may be received from the second user via the hosted portal. In an exemplary embodiment, consistent with present disclosures, the second user may interact with the transmitted hyperlink to be directed to the hosted portal. The hosted portal may be unique to the second user and the refund transaction. In another exemplary embodiment, the second user may interact with the hosted portal to provide the payout information. The payout information may include a user preference and personally identifiable information of the second user. For example, the user preference may include configurations related to future refund payments from the first user as well as for future refund payments from any other user. In another example, the personally identifiable information may include bank account information of the second user that is required to facilitate the refund payment.

In another exemplary embodiment, multi-factor authentication may be required prior to an interaction between the second user and the hosted portal. Multi-factor authentication may correspond to an electronic authentication method in which a user is granted access to data only after successfully presenting two or more factors to an authentication mechanism. The factors may include user knowledge, i.e., something only the user knows, user possession, i.e., something only the user has, and user inherence, i.e., something only the user is. For example, a secondary email message with a passcode may be sent to the second user. The secondary email message may be separate from the initial email message that includes the hyperlink. Access to the hosted portal may be limited for the second user until the passcode is provided.

At step S412, a transaction may be automatically initiated based on the transaction information and the payout information. Consistent with present disclosures, the transaction may include the refund transaction. The refund transaction may be initiated according to data in the transaction information the payout information. For example, the transaction information may provide an amount of the refund and the payout information may provide a destination bank account number for the refund. In an exemplary embodiment, the transaction may be automatically initiated without additional intervention from either the first user or the second user. The transaction may be automatically initiated consistent with predetermined parameters dictated by the first user, the second user, and the operator of the hosted portal.

In another exemplary embodiment, an indication from the second user to persist the payout information may be received via the hosted portal. The second user may provide the indication by interacting with a graphical element such as, for example, a button on the hosted portal. Then, the payout information may be tokenized and associated together with the second user. The association together with a record of information that relates to the automatically initiated transaction may be persisted in a repository.

In another exemplary embodiment, to tokenize the payout information, the payout information may be parsed to identify pertinent elements. The pertinent elements may correspond to individual data sets such as, for example, a bank account number data set. Then, each of the pertinent elements may be substituted with a token. The token may include an identifier that references the corresponding elements. The token may not have extrinsic and/or exploitable meaning and/or value such that an observer may not identify the correspond referenced elements.

In another exemplary embodiment, a response may be generated for the first user upon completion of the automatically initiated transaction. The response may include status information and the tokenized payout information. The status information may correspond to the automatically initiated transaction. For example, the status information may indicate that the automatically initiated transaction is completed. In another example, the status information may indicate that an error has occurred in the automatically initiated transaction and provide corresponding error information. Then, the response may be transmitted to the first user via a communication interface. In another exemplary embodiment, the first user may store the tokenized payout information to facilitate future transactions with the second user. As will be appreciated by a person of ordinary skill in the art, security of the payout information is increased for the second user because the first user only has access to the token and not the underlying data.

In another exemplary embodiment, a validity attribute may be determined for the second user. The validity attribute may include a time period such as, for example, a one month time period or a one year time period upon which the tokenized payout information may be usable by the first user. The validity attribute may be associated and stored together with the tokenized payout information. For example, the validity attribute may indicate that the tokenized payout information will expire in thirty days. Thus, the tokenized payout information will no longer be usable to facilitate transactions with the second user more than thirty days from when the tokenized payout information was generated.

In another exemplary embodiment, the validity attribute may be determined for the second user based on predetermined guidelines. The predetermined guidelines may include a user guideline, a business guideline, and a regulatory guideline. The user guideline may relate to a preferential time period that the second user would like for the tokenized payout information to be valid for transactions. The business guideline may relate to a policy that dictates the time period when the tokenized payout information is valid for transactions. The regulatory guideline may relate to regulatory requirements that dictate the time period when the tokenized payout information is valid for transactions.

In another exemplary embodiment, the validity attribute may correspond to a predetermined usage threshold. The predetermined usage threshold may dictate that the tokenized payout information is no longer usable after a predetermined number of uses. For example, for a predetermined usage threshold of five uses, the validity attribute may indicate that the tokenized payout information is no longer valid for transactions after the fifth transaction.

In another exemplary embodiment, the tokenized payout information may be automatically removed from systems associated with the first user after satisfaction of the validity attribute. An automated action may be initiated by the claimed invention to remove the tokenized payout information. For example, when the validity period is thirty days, the tokenized payout information may be automatically deleted thirty days after generation. In another exemplary embodiment, a request may be automatically generated and sent to the first user when the validity attribute is satisfied. The request may require that the first user remove the tokenized payout information from computing systems associated with the first user. For example, when the validity period is thirty days, the request may be automatically generated for the first user thirty days after generation of the tokenized payout information.

In another exemplary embodiment, to facilitate onboarding of a third user, account information for the third user may be received via the hosted portal. The account information may be registered to onboard the third user. Consistent with present disclosures, the account information may be tokenized and associated together with the third user. Then, the association together with a trigger that automatically bypasses hyperlink generation may be persisted in the repository for the third user. By onboarding account information with the hosted portal in advance, the third user may automatically receive refund payments without having to provide the account information for each transaction.

In another exemplary embodiment, to automatically initiate the transaction, a code may be generated. The code may include at least one from among a human-readable textual code and a machine-readable optical code. The human readable textual code may include alphanumeric characters and symbols in any language. The machine-readable optical code may include optical labels such as, for example, a matrix barcode that contains encoded information. Then, the code may be associated with the second user and transmitted to the second user via the communication channel. Consistent with present disclosures, the communication channel may be determined based on data extracted from the user information.

In another exemplary embodiment, the code may be received from the second user via an automated teller machine (ATM). The code may be authenticated based on the known association with the user as well as with multi-factor authentication via a user device of the second user. For example, a password may be subsequently provided to the second user via the communication channel. The password may be inputted by the second user into the ATM when requested to facilitate multi-factor authentication. Then, a distribution may be initiated for the second user based on a result of the authentication. The distribution may be initiated via the ATM. The distribution may correspond to the transaction information. For example, the distribution may include a cash distribution via the ATM according to the refund amount in the transaction information.

In another exemplary embodiment, automated transactions such as, for example, payroll transactions for a plurality of users may be automatically initiated via batch processing. To initiate the batch processing, a request may be received from a first user such as, for example, an employer. The request may include information that relates to each of the plurality of users such as, for example, banking information as well as transaction information that corresponds to each of the plurality of users such as, for example, a payment amount information. The request may be parsed to identify each of the plurality of users and the corresponding information. Then, consistent with present disclosures, a hosted portal to facilitate secured payouts process may be initiated for each of the plurality of users based on the parsed information.

In another exemplary embodiment, errors may be detected for a payee from the plurality of users during initiation of the hosted portal process. The errors may relate to discrepancies between the parsed information and information on record for the payee. For example, a name of the payee from the parsed information may not match with the name on record for an account holder associated with the account information from the parsed information. Then, a resolution action may be automatically determined for each of the errors based on a predetermined guideline. The resolution action may include generating instructions on the hosted portal associated with the payee for confirmation of payee information. The confirmation of payee information may include the retrieval of correct payee information and/or the retrieval of missing payee information as indicated by the generated instructions. The hosted portal may receive inputs from the payee and/or an employer for the confirmation. After confirmation of the payee information and determination that no additional errors are present, a transaction for the payee may be automatically initiated consistent with present disclosures.

Figure 5:
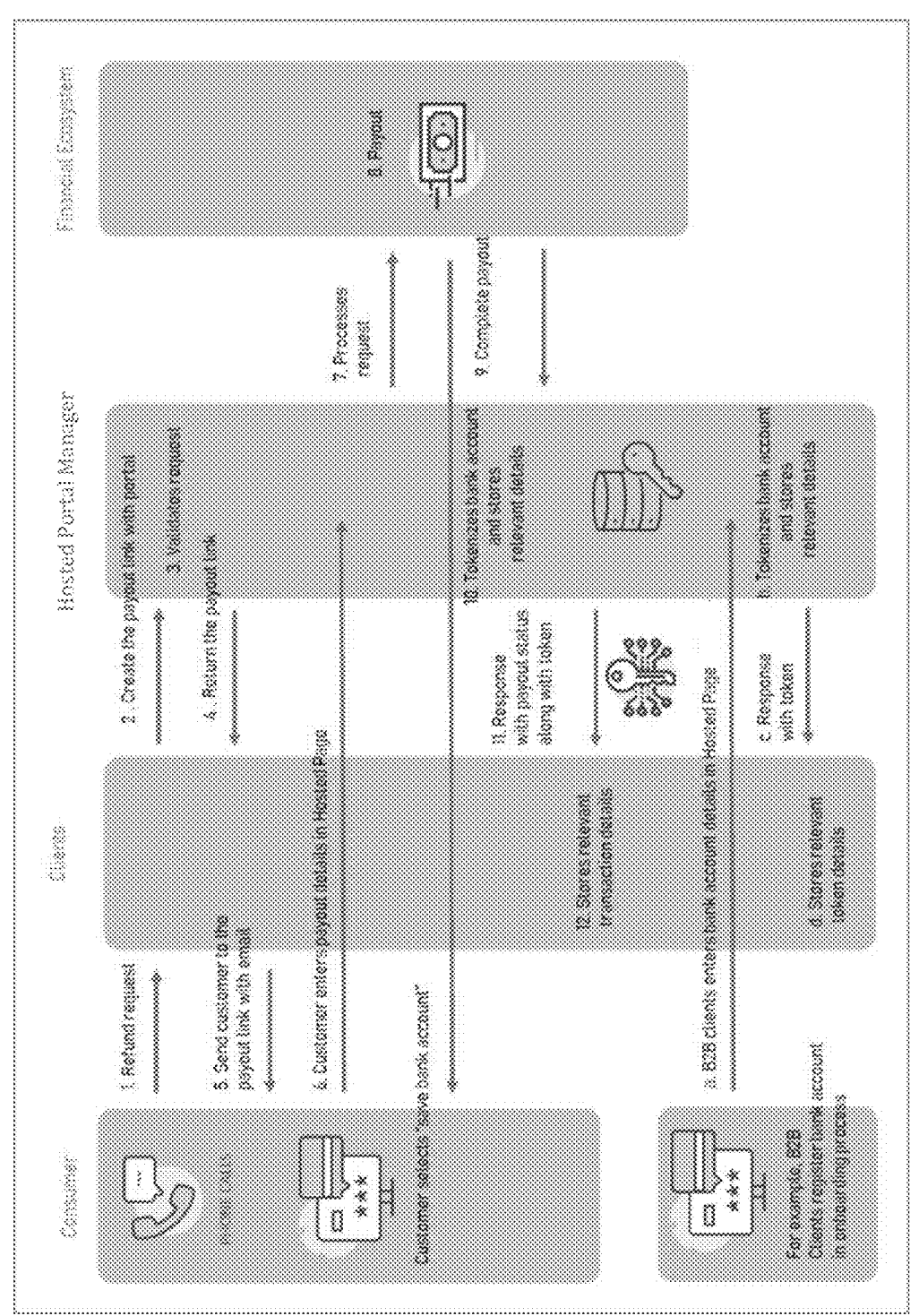
FIG. 5 is a design and flow diagram of an exemplary process for implementing a method for providing hosted portals to facilitate secured payouts via individualized hyperlinks for end users.

FIG. 5 is a design and flow diagram of an exemplary process for implementing a method for providing hosted portals to facilitate secured payouts via individualized hyperlinks for end users. In FIG. 5, a high-level data flow is provided consistent with present disclosures.

As illustrated in FIG. 5, at step 1, a consumer may initiate a refund request with a client of the hosted portal. The client may correspond to a merchant who provides goods and services for the consumer. At step 2, the client may interact with the hosted portal to create a payout hyperlink. At step 3, a hosted portal manager may validate the request to ensure compliance with predetermined parameters. Then, at step 4, the hosted portal manager may return the payout hyperlink to the client.

At step 5, the client may send the hyperlink to the consumer via a communication channel such as, for example, an email. At step 6, the consumer may enter payout details such as, for example, account details in a hosted page that is accessible for the consumer by interacting with the hyperlink. At step 7, the hosted portal manager pay process the request. At step 8, the consumer may receive the payout via a connected financial ecosystem.

At step 9, payout is completed by the financial ecosystem and a notification is sent to the hosted portal manager. At step 10, when the consumer selects "save bank account", the hosted portal manager tokenizes the bank account information and stores relevant details in a repository. At step 11, a response with payout status is provided to the client along with the token. At step 12, the client stores relevant transaction details.

Additionally, for business to business (B2B) clients, back account information may be registered in an onboarding process. At step "a", B2B clients enter bank account details in a hosted page. At step "b", the hosted portal manager tokenizes the bank account details and stores relevant data. At step "c", the hosted portal manager provides a response to the client with a token. Then, at step "d" the client may store relevant token details to facilitate future transactions.

Accordingly, with this technology, an optimized process for providing hosted portals to facilitate secured payouts via individualized hyperlinks for end users is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a hosted portal to facilitate a secured transaction, the method being implemented by at least one processor, the method comprising:

transmitting a first communication, by a consumer device to a client device;

generating, by the client device, at least one request based on the first communication received from the consumer device;

transmitting, by the client device and via a first communication channel to a server, the at least one request;

receiving, by the at least one processor via the hosted portal, the at least one request transmitted by the client device, the at least one request including a refund request generated by the client device for securely issuing a refund to the consumer device, the refund request including user information including an internet protocol (IP) address associated with the client device and the consumer device, and transaction information;

generating, by the client device interacting with the hosted portal, at least one hyperlink for a user of the consumer device based on the transaction information, the at least one hyperlink referencing the hosted portal while bypassing the client device, wherein the at least one hyperlink is temporary and has an expiration limit, and wherein the client device interacts with the hosted portal by transmitting the transaction information and the IP address of the consumer device to the hosted portal, and the hosted portal reserves a network data storage location corresponding to the transaction information and the IP address of the consumer device for generating the at least one hyperlink that is unique to the consumer device and the at least one request;

validating, by the hosted portal, the at least one request by using the user information;

first transmitting, via the hosted portal and to the consumer device via the client device using a second communication channel that is different from the first communication channel, a second communication including the at least one hyperlink to the consumer device based on a result of the validating by the hosted portal, the at least one hyperlink being accessible over a computing network, the at least one hyperlink pointing to a data storage location via the hosted portal and bypassing the client device, and the at least one hyperlink being specific to the user of the consumer device and to the at least one request, wherein the second communication is an email;

second transmitting, separately from the first transmitting and by the hosted portal to the consumer device while bypassing the client device, at least one code corresponding to the at least one hyperlink, wherein access to the hosted portal via the at least one hyperlink is limited until the at least one code is provided;

receiving, via the hosted portal, sensitive information from the consumer device and expanding the access to the hosted portal in response to the receiving of the sensitive information, the sensitive information including the at least one code, wherein the at least one code is submitted via an automated teller machines (ATM), wherein the ATM is configured to intake a physical card and dispense cash;

authenticating the at least one code via multi-factor authentication via the consumer device, wherein the multi-factor authentication includes a password submitted via the consumer device via a communication channel;

closing the access to the hosted portal, by the at least one processor, upon entry and the authenticating of the at least one code;

automatically initiating, by the at least one processor and via the ATM, the secured transaction based on the transaction information and the sensitive information, wherein the secured transaction includes providing a cash distribution in an amount corresponding to the refund request via the ATM;

transmitting, by a third party ecosystem associated with the ATM and to the hosted portal, an indication of fulfillment of the refund request upon completion of the secured transaction; and tokenizing, by the hosted portal, the indication of fulfillment of the refund request and transmitting, by the hosted portal to the client device, the tokenized indication of fulfillment of the refund request to notify the client device.

2. The method of claim 1, further comprising:

receiving, by the at least one processor via the hosted portal, an indication from the consumer device to persist the sensitive information;

tokenizing, by the at least one processor, the sensitive information;

associating, by the at least one processor, the tokenized sensitive information together with the consumer device; and persisting, by the at least one processor in a repository, the association together with information that relates to the automatically initiated secured transaction.

3. The method of claim 2, wherein tokenizing the sensitive information further comprises:

parsing, by the at least one processor, the sensitive information to identify at least one element; and substituting, by the at least one processor, each of the at least one element with a token, the token including an identifier that that references a corresponding element among the at least one element.

4. The method of claim 2, further comprising:

generating, by the at least one processor, at least one response for the client device, the at least one response including status information and the tokenized sensitive information; and third transmitting, by the at least one processor via a communication interface, the at least one response to the client device, wherein the status information corresponds to the automatically initiated secured transaction.

5. The method of claim 1, further comprising:

receiving, by the at least one processor via the hosted portal, account information for a third user device;

registering, by the at least one processor, the account information to onboard the third user device;

tokenizing, by the at least one processor, the account information;

associating, by the at least one processor, the tokenized account information together with the third user device; and persisting, by the at least one processor in a repository, the association together with a trigger that automatically bypasses hyperlink generation for the third user device.

6. The method of claim 1, wherein the at least one code includes at least one from among a human-readable textual code and a machine-readable optical code; and wherein the method further comprises:

associating, by the at least one processor, the at least one code with the consumer device.

7. The method of claim 1, wherein the second communication channel is determined based on data extracted from the user information, the second communication channel including at least one from among an electronic mail channel, a chat channel, and a multimedia messaging channel.

8. A system configured to implement an execution of a method for providing a hosted portal to facilitate a secured transaction, the system comprising:

a consumer device that transmits a first communication to a client device;

the client device that receives the first communication from the consumer device and generates at least one request in response to the first communication received, and transmits, via a first communication channel and to a server, the at least one request;

an automated teller machine (ATM);

a third party ecosystem; and the server that hosts the hosted portal, the server comprising:

a processor;

a memory; and a communication interface coupled to each of the processor and the memory, wherein the processor is configured to:

receive, via the hosted portal, the at least one request transmitted by the client device, the at least one request including a refund request generated by the client device for securely issuing a refund to the consumer device, the refund request including user information including an internet protocol (IP) address associated with the client device and the consumer device, and transaction information;

generate, via the hosted portal interacting with the client device, at least one hyperlink for a user of the consumer device based on the transaction information, the at least one hyperlink referencing the hosted portal while bypassing the client device, wherein the at least one hyperlink is temporary and has an expiration limit, and wherein the client device interacts with the hosted portal by transmitting the transaction information and the IP address of the consumer device to the hosted portal, and the hosted portal reserves a network data storage location corresponding to the transaction information and the IP address of the consumer device for generating the at least one hyperlink that is unique to the consumer device and the at least one request;

validate, via the hosted portal, the at least one request by using the user information;

first transmit, via the hosted portal and to the consumer device via the client device using a second communication channel that is different from the first communication channel, a second communication including the at least one hyperlink to the consumer device based on a result of the validating, the at least one hyperlink being accessible over a computing network, the at least one hyperlink pointing to a data storage location via the hosted portal and bypassing the client device, and the at least one hyperlink being specific to the user of the consumer device and to the at least one request, wherein the second communication is an email;

second transmit, via the hosted portal, separately from the first transmit and to the consumer device while passing the client device, at least one code corresponding to the at least one hyperlink, wherein access to the hosted portal via the at least one hyperlink is limited until the at least one code is provided;

receive, via the hosted portal, sensitive information from the consumer device and expand the access to the hosted portal in response to the sensitive information being received, the sensitive information including the at least one code, wherein the at least one code is submitted via the ATM, wherein the ATM is configured to intake a physical card and dispense cash;

authenticate the at least one code via multi-factor authentication via the consumer device, wherein the multi-factor authentication includes a password submitted via the consumer device via a communication channel;

close the access to the hosted portal, upon entry and authentication of the at least one code;

automatically initiate, via the ATM, the secured transaction based on the transaction information and the sensitive information, wherein the secured transaction includes providing a cash distribution in an amount corresponding to the refund request via the ATM;

receive, from a third party ecosystem associated with the ATM and via the hosted portal, an indication of fulfillment of the refund request upon completion of the secured transaction; and tokenize the indication of fulfillment of the refund request and transmitting, via the hosted portal to the client device, the tokenized indication of fulfillment of the refund request to notify the client device.

9. The system of claim 8, wherein the processor is further configured to:

receive, via the hosted portal, an indication from the consumer device to persist the sensitive information;

tokenize the sensitive information;

associate the tokenized sensitive information together with the consumer device; and persist, in a repository, the association together with information that relates to the automatically initiated secured transaction.

10. The system of claim 9, wherein, to tokenize the sensitive information, the processor is further configured to:

parse the sensitive information to identify at least one element; and substitute each of the at least one element with a token, the token including an identifier that that references a corresponding element among the at least one element.

11. The system of claim 9, wherein the processor is further configured to:

generate at least one response for the client device, the at least one response including status information and the tokenized sensitive information; and third transmit, via the communication interface, the at least one response to the client device, wherein the status information corresponds to the automatically initiated secured transaction.

12. The system of claim 8, wherein the processor is further configured to:

receive, via the hosted portal, account information for another consumer device;

register the account information to onboard the other consumer device;

tokenize the account information;

associate the tokenized account information together with the other consumer device; and persist, in a repository, the association together with a trigger that automatically bypasses hyperlink generation for the other consumer device.

13. The system of claim 8, wherein the at least one code includes at least one from among a human-readable textual code and a machine-readable optical code; and wherein the processor is further configured to:

associate the at least one code with the consumer device.

14. The system of claim 8, wherein the processor is further configured to determine the second communication channel based on data extracted from the user information, the second communication channel including at least one from among an electronic mail channel, a chat channel, and a multimedia messaging channel.

* * * * *